June 3, 1930.  O. E. FISHBURN  1,762,132
GEAR SHIFTER LEVER
Filed July 29, 1929
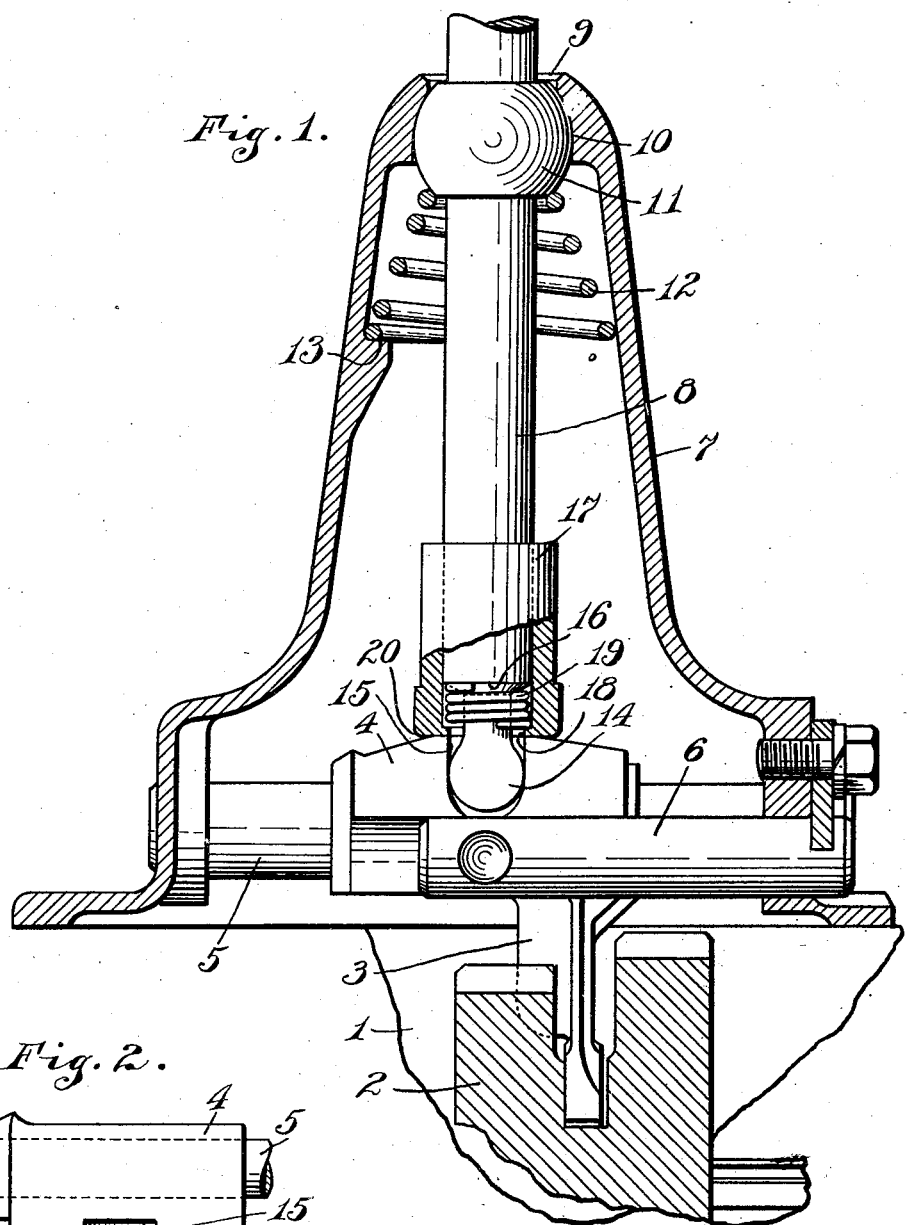
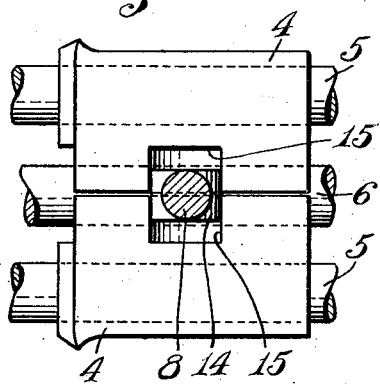
INVENTOR.
Otto E. Fishburn,
BY
Hood + Hahn.
ATTORNEYS Patented June 3, 1930

1,762,132

UNITED STATES PATENT OFFICE

OTTO E. FISHBURN, OF MUNCIE, INDIANA, ASSIGNOR TO WARNER GEAR COMPANY, OF MUNCIE, INDIANA, A CORPORATION OF INDIANA

GEAR-SHIFTER LEVER

Application filed July 29, 1929. Serial No. 382,020.

My invention relates to improvements in automobile transmissions and the like and particularly to the shifting means for such transmissions. As is usual in the commercial structures of these devices, there are provided two or more shifter forks which are slidably mounted on or with rods and these forks engage the transmission gearing for shifting the gears into and out of mesh. Heretofore, there has been a certain amount of vibration set up in the shifter forks resulting in undesirable noises.

It is one of the objects of my invention to provide means for preventing this vibration in the shifter forks for rendering the same more noiseless.

For the purpose of disclosing my invention, I have illustrated one embodiment thereof in the accompanying drawings in which:

Fig. 1 is a sectional view of the shifting lever support, showing the support and forks in position;

Fig. 2 is a plan view of the shifter forks.

In the embodiment illustrated, the usual transmission housing 1 is provided with the usual transmission gears 2. For controlling the shifting of these gears, I provide shifter forks as 3. These forks are mounted on slide members 4, in turn slidably mounted on slide rods 5 and guided by guide rods 6. These guide rods are preferably mounted in a top covering for the transmission box which takes the form of a dome shaped member 7, in which the shifter lever 8 is supported. The top end of the support has an opening 9 therethrough, through which extends the shifter lever and surrounding this opening is a spherical recess 10 adapted to receive the ball shoulder 11 on the lever. The lever is maintained in position by a coiled spring 12 which is interposed between the ball shoulder 11 and a shoulder 13 on the inside of the support.

The lower end of the lever is provided with a ball extension 14 adapted to engage in a transversely extending slot 15 on each of the shifter members 4 for the purpose of moving the same. This ball 14 is on a neck which is reduced in diameter and forms an extension of the lever 8, and by this reduction, a shoulder 16 is provided at the lower end of the lever. In order to prevent vibration on the part of the shifter forks during the operation of the engine, I provide a sleeve 17 which is slidably mounted on the lower end of the shifter lever 8 and which bears at its lower end on the top of the shifter fork members 4. This sleeve is provided with an inwardly extending annular shoulder 18 between which, and the shoulder 16 on the lever, is interposed a coiled spring 19 for biasing the sleeve into engagement with the tops of the shifter fork members 4. The lower end of this sleeve is rounded as at 20, and it will be noted that while the sleeve resiliently bears on the shifter forks it in no way interferes with the movement of the lever, as the sleeve is slidably mounted on the lever and will give in a vertical direction during the different shifting movements of the lever.

It will be readily understood that, without departing from my invention, the rod 5 for each fork 4 may be attached to and move with its fork, sliding in suitable bearings formed in the dome 7.

I claim as my invention:

1. The combination with a shifter lever, of a shifter fork having a slot therein to receive the end of said lever, a sleeve slidably mounted on the end of said lever and resilient means for biasing said sleeve into engagement with the top of said fork.

2. The combination with a shifter lever, of a shifter fork having a slot therein to receive the end of said lever, and means on the end of said lever resiliently bearing on the top of said fork.

3. The combination with a shifter lever, of a shifter fork having a slot therein to receive the end of said lever, and a vertically slidable member on said lever resiliently biased into engagement with the top of said fork.

4. The combination with a shifter lever having an annular shoulder at the lower end thereof, of a shifter fork having a transverse slot for receiving the end of said lever, a vertically slidable sleeve surrounding the lower end of said lever having an inturned annular shoulder, and a coiled spring interposed between the lever shoulder and the sleeve shoulder for maintaining the sleeve in engagement with the top of the shifter fork.

5. The combination with shifter fork support a shifter lever and a shifter fork having coordinated parts separable in one direction and interlocking in another direction, of a spring-actuated element carried by one of said members and continuously in yielding engagement with the other to exert a yielding engagement with the other to exert a yielding force tending to hold the fork seated in its support.

6. The construction defined in claim 5 wherein the spring-actuated element is carried by the shifter lever.

In witness whereof, I, OTTO E. FISHBURN, have hereunto set my hand at Muncie, Indiana, this 11th day of July, A. D. one thousand nine hundred and twenty-nine.

OTTO E. FISHBURN.